(12) United States Patent
Yoshida et al.

(10) Patent No.: US 6,454,042 B1
(45) Date of Patent: Sep. 24, 2002

(54) BALL SCREW AND ELECTRICALLY POWERED STEERING DEVICE HAVING THE BALL SCREW

(75) Inventors: Isamu Yoshida; Yoshinori Ikeda, both of Iwata (JP)

(73) Assignee: NTN Corporation, Osaka (JP)

( * ) Notice: Subject to any disclaimer, the term of this patent is extended or adjusted under 35 U.S.C. 154(b) by 0 days.

(21) Appl. No.: 09/704,678

(22) Filed: Nov. 3, 2000

(30) Foreign Application Priority Data

Nov. 4, 1999 (JP) ............................................. 11-313518

(51) Int. Cl.⁷ ................................................ B62D 5/04
(52) U.S. Cl. ..................................... 180/444; 74/424.83
(58) Field of Search ........................ 74/424.82, 424.83; 180/443, 444

(56) References Cited

U.S. PATENT DOCUMENTS

| | | | |
|---|---|---|---|
| 3,156,133 A | * | 11/1964 | Anthony |
| 3,176,535 A | * | 4/1965 | Rowland |
| 4,364,282 A | * | 12/1982 | Nilsson .................. 74/424.8 A |
| 4,859,394 A | * | 8/1989 | Benton et al. ............... 264/225 |
| 4,924,722 A | * | 5/1990 | Bacardit et al. ............... 74/459 |
| 5,284,219 A | * | 2/1994 | Shimizu et al. ............ 180/79.1 |
| 5,388,475 A | * | 2/1995 | Shear, III et al. .............. 74/459 |
| 6,082,210 A | * | 7/2000 | Ise ............................... 74/459 |
| 6,192,585 B1 | * | 2/2001 | Buchanan, Jr. et al. .. 29/898.06 |

* cited by examiner

*Primary Examiner*—Avraham Lerner
(74) *Attorney, Agent, or Firm*—Sughrue Mion, PLLC

(57) ABSTRACT

A ball screw (20) includes a bridge member (24) fitted to a rotary nut (22) and provided with a plurality of connecting grooves (28). Each connecting groove (28) connects neighboring convolutions of an inner spiral groove (26) of the rotary nut (22). The ball screw (20) is used as a mechanism for transmitting rotation of a rotor (10) of a motor (8) to a steering shaft (2) in an electrically powered steering device.

9 Claims, 6 Drawing Sheets

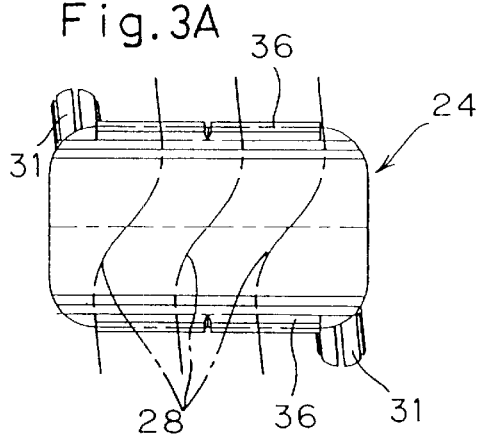
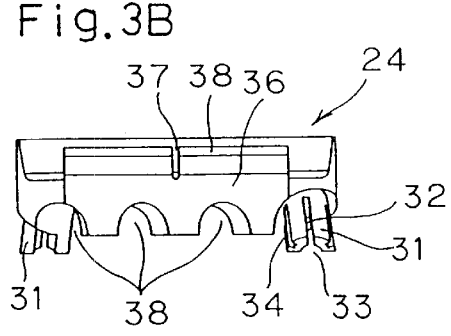
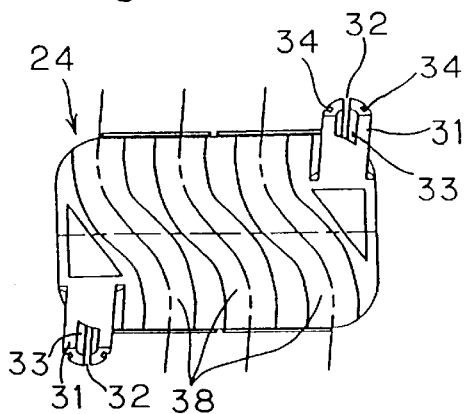
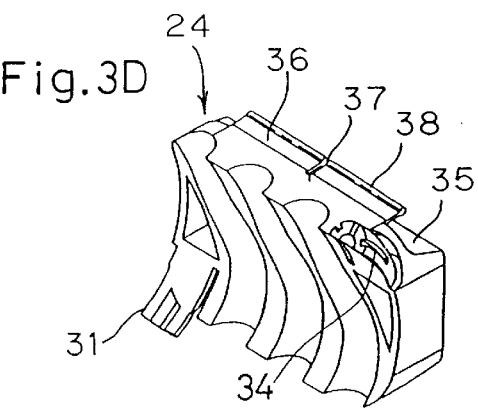
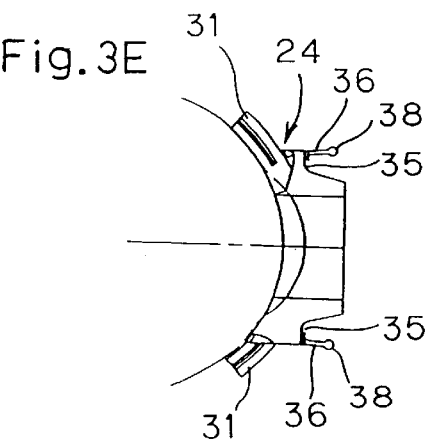

BALL SCREW AND ELECTRICALLY POWERED STEERING DEVICE HAVING THE BALL SCREW

BACKGROUND OF THE INVENTION

1. Field of the Invention

The present invention relates to a bridge type ball screw and an electrically powered steering device having the ball screw.

2. Description of the Prior Art

The electrically powered steering device of an automobile is an instrument to assist the steering force of a steering wheel by means of an electric drive motor and is currently available in various types. One of the types employs is of a design wherein a retractable steering shaft coupled with a steering mechanism for vehicle wheels is imparted an axially shifting force that is transmitted thereto from the steering wheel through a motion translating mechanism such as a rack-and-pinion mechanism and, also, an axially shifting force that is transmitted thereto from an output of the electric drive motor through a ball screw. The ball screw that is compact and has high load capacity is desired so as to downsize a whole electrically powered steering device thereby to reduce weight of a whole automobile.

The ball screw is available in various types according to the manner in which a series of balls are circulated and one of the types is called a bridge type.

FIGS. 6(A) and 6(B) illustrate an example of the prior art ball screw mechanism of the bridge type. A screw shaft 51 has an externally threaded groove 52 in its outer face. A rotary nut 53 has an internally threaded groove 54 corresponding to the externally threaded groove 52 and is screwed on the screw shaft 51 through a number of balls 55 accommodated between both the threaded grooves 52 and 54. In a cylindrical body portion of the rotary nut 53, fitting holes 56 which are in oval shapes when viewed in a radial direction are formed to notch portions of the internally threaded groove 54 and to pass through inner and outer peripheral faces of the cylindrical body portion and oval bridge members 57 are fitted in the fitting holes 56. The bridge member 57 is a part having a connecting groove 58 for connecting portion s of the internally threaded groove 54 that are neighboring in an axial direction of the rotary nut 53 and substantially a lap of the internally threaded groove 54 and the connecting groove 58 define a ball guide passage for the balls 55. The large number of balls 55 arranged between the internally and externally threaded grooves 54 and 52 in the ball guide passage roll along the threaded grooves 54 and 52, are guided by the connecting groove 58 of the bridge member 57, climb over the thread of the screw shaft 51, and return to the neighboring internally threaded groove 54 to circulate.

The bridge type ball screw has an advantageous in that the rotary nut 53 can have a small outer diameter but has a disadvantage in that the number of component parts is large because the large number of bridge members are required. Moreover, the following problems are encountered when the load capacity is increased.

There are the following means of increasing the load capacity in the ball screw, but it is difficult to employ any of them in the bridge type ball screw as described below.

(1) A screw thread pitch is reduced to increase the number of ball circulations. If this means is employed and a ball diameter is reduced, the load capacity. is reduced on the contrary. Therefore, it is necessary to reduce the pitch without changing the ball diameter. However, because one bridge member 57 is necessary for one pitch (an interval between the threaded grooves) in the bridge type, a large number of bridge members 57 are required when the pitch is reduced without changing the ball diameter, which is difficult to realize in view of space.

(2) A groove is formed between leads to form multi-thread grooves to obtain similar effects to that in a case of increased number of circulations. In the multi-thread grooves, however, the lead (distance which the nut travels with a turn) is limited and the lead cannot be reduced. Although the multi-thread grooves can be employed for an end cap type, the multi-thread grooves cannot be employed for the bridge type because the bridge type requires one bridge member 57 for every pitch as described above.

Therefore, in order to increase the load capacity in the bridge type ball screw, there is no other choice but to increase a length of the nut and the number of the ball circulations. In this case, there is an advantage of reduced nut diameter but it is difficult to make the ball screw because the length of the nut is increased. As the length of the nut is increased, the number of the bridge members 57 is increased and the number of man-hours and the number of parts are further increased, which results in a raise in cost.

SUMMARY OF THE INVENTION

It is an object of the present invention to provide a ball screw in which the number of parts is small, which is compact, and in which a high load capacity can be obtained.

It is another object of the invention to provide an electrically powered steering device in which a ball screw for transmitting output of an electric drive motor is compact, a load capacity of the ball screw can be increased, and a whole device can be made compact.

A ball screw of the present invention comprises: a screw shaft; a rotary nut having at an inner periphery thereof inner spiral grooves facing the screw shaft; a plurality of balls disposed in a rolling guideway formed between the screw shaft and the inner spiral groove for transmitting a force between the rotary nut and the screw shaft; and a bridge member fitted to the rotary nut and having a plurality of connecting grooves. Each connecting groove connects neighboring convolutions of the inner spiral groove.

With this structure, since the plurality of connecting grooves are provided to one bridge member, the pitch of the inner spiral groove can be reduced while the bridge member being disposed with no difficulty in terms of the space available therefor. As a result, it is possible to increase the number of balls to be circulated and the capacity load without increasing the length of the rotary nut. Together with an advantage in that the diameter of the nut can be reduced similarly to the prior art bridge type ball screw, it is possible to form the ball screw that is compact and has high load capacity. Moreover, because the plurality of connecting grooves are provided to one bridge member, the number of the bridge members can be small and hence, the number of the parts can be reduced thereby facilitating machining process and the cost can be reduced. Furthermore, because the plurality of connecting grooves are provided to one bridge member, accuracy in forming the connecting grooves can be improved easily.

In this invention, the bridge member may be provided with an arm that is engaged with the inner spiral groove of the rotary nut so as to position the bridge member in an axial direction with respect to the rotary nut. The arm may be provided with a slit extending from a tip end toward a base portion of the arm.

As described above, because the arms of the bridge member are engaged with the inner spiral groove formed as a ball raceway of the rotary nut, the bridge member can be positioned with high accuracy. In case the arm is provided with the slit, the arm can have elasticity and can be fitted smoothly with an inner surface of the inner spiral groove without a gap therebetween.

In this invention, the bridge member may be provided with a pair of guide walls protruding radially outwardly of the rotary nut from opposite edges of the bridge member confronting to each other in a circumferential direction of the rotary nut. The guide walls may be in elastic contact with a pair of inner surfaces, facing to each other, of a bridge member fitting opening formed in the rotary nut.

As described above, by providing the bridge member with the guide walls, it is possible to fix the bridge member to the bridge member fitting opening while bringing the bridge member into elastic contact therewith and accordingly, the bridge member can be fitted easily.

In this invention, the bridge member may be inserted into the bridge member fitting opening formed in the rotary nut from a radially inner side. By inserting the bridge member from a radially inner side in this manner, any detach preventing means can be dispensed with.

In the case of providing the guide walls as described above, since the bridge member is arranged so as to be inserted from the radially inner side, the pair of guide walls may be provided at tip ends thereof with detach preventing projections to engage with opening edges on a radially outer side of the bridge member fitting opening. Since by inserting the bridge member into the bridge member fitting opening from the radially inner side can the detach preventing projections at the tip ends of the guide walls be engaged with the radially outer edge of the bridge member fitting opening, the bridge member can be fixed easily only by insertion work.

The guide wall may be provided with a slit extending from a tip end toward a base portion side of the guide wall. By providing the slit in this manner, elasticity of the guide wall can be increased thereby to easily fit the bridge member in the bridge member fitting opening with a smaller gap therebetween.

The bridge member may be made of a sintered alloy. If the bridge member is made of the sintered alloy, the bridge member can be produced by formation such as injection molding and sintering, which does not require machining such as turning or grinding and which has satisfactory mass productivity. Therefore, manufacturing at low cost can be attained.

An electrically powered steering device of the present invention comprises: a housing; a steering shaft connected to a steering mechanism for steering wheels; a motion translating mechanism for translating a rotary force exerted by a steering wheel into a force required to move the steering shaft in a longitudinal direction; a ball screw including a screw shaft constituted by a portion of the steering shaft; and an electric drive motor mounted on a rotary nut of the ball screw, wherein the ball screw is constituted by the ball screw with any above-described structure.

With this structure, because the ball screw for transmitting the electric drive motor output can be made compact while having high load capacity, the whole electrically powered steering device can be fabricated in a compact size.

BRIEF DESCRIPTION OF THE DRAWINGS

In any event, the present invention will become more clearly understood from the following description of a preferred embodiment thereof, when taken in conjunction with the accompanying drawings. However, the embodiment and the drawings are given only for the purpose of illustration and explanation, and are not to be taken as limiting the scope of the present invention in any way whatsoever, which scope is to be determined by the appended claims. In the accompanying drawings, like reference numerals are used to denote like parts throughout the several views, and:

FIGS. 3A to 3E are a front view, a plan view, a rear view, a perspective view and a side view, respectively, of a bridge member in the ball screw;

DETAILED DESCRIPTION OF THE EMBODIMENTS

Figure 1A:
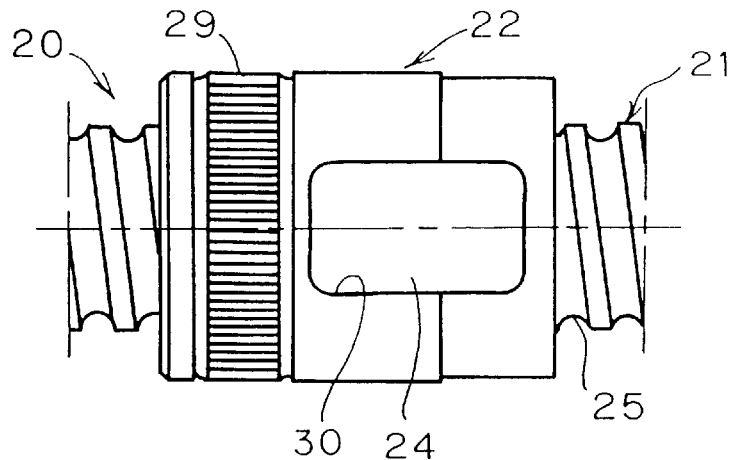
FIGS. 1A, 1B and 1C are a front view of a ball screw according to one embodiment of the present invention, a longitudinal sectional view of the ball screw and a schematic perspective view of a bridge member of the ball screw, respectively.
Figure 1B:
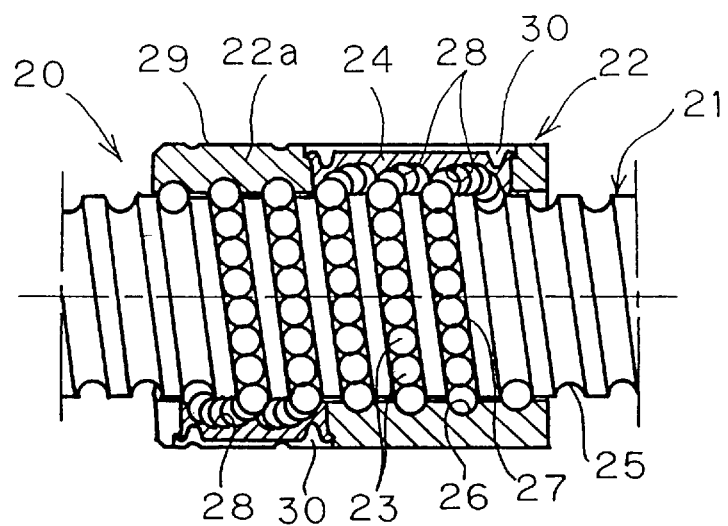
Figure 1C:
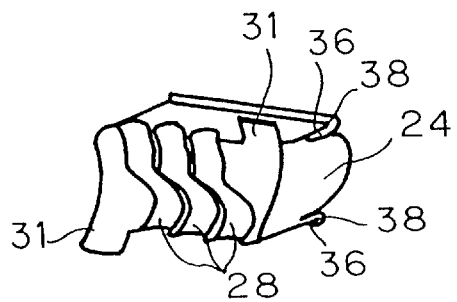

An embodiment of the present invention will be described in conjunction with FIGS. 1 to 5. As shown in FIGS. 1A and 1B, a ball screw 20 has a screw shaft 21, a rotary nut 22, and a plurality of balls 23. The rotary nut 22 is formed by mounting a bridge member 24 to a nut body 22a. The screw shaft 21 has an outer spiral groove 25. The rotary nut 22 has an inner spiral groove 26 facing the outer spiral groove 25 at an inner periphery of the nut body 22a formed into a cylindrical shape. Sectional shapes of the inner and outer spiral grooves 26 and 25 are Gothic arch shapes, to be exact. The balls 23 are disposed in a ball rolling guideway 27 defined between the outer spiral groove 25 of the screw shaft 21 and the inner spiral groove 26 of the rotary nut 22. A coarse surface portion 29 obtained by knurling or the like is formed at a portion of an outer peripheral surface of the rotary nut 22 and is used for connecting with a motor rotor.

The bridge member 24 has a connecting groove 28 for connecting convolutions of the inner spiral groove 26 which convolutions neighbor in an axial direction of the rotary nut 22. The substantial single convolution of the spiral inner groove 26 and the connecting groove 28 altogether from a circumferential circuit for the balls 23. In other words, opposite ends of the single convolution of the spiral inner groove 26 are communicated with the single return groove 28 to define the continuous circumferential circuit of a length corresponding to the circumference of the single convolution or one turn of the inner spiral groove 26. The single bridge member 24 is provided with a plurality of (three, in this example) connecting grooves 28. Each of the connecting grooves 28 connects different neighboring convolutions of the inner spiral groove 26. In this embodiment, the neighboring convolutions positioned in series along the inner spiral groove 26 are connected by the respective connecting grooves 28. The inner spiral groove 26 of the rotary nut 22 is divided into a plurality of circuits arranged within a range of an axial length of the bridge member 24. Each connecting groove 28 has a depth sufficient to allow the ball 23 to ride over a crest of the outer spiral groove 25 of the screw shaft 21.

The bridge members 24 are mounted to the nut body 22a in two positions separate in an axial direction and these two bridge members 24 are in positions at 180° separate to each other in a circumferential direction. The numbers of the connecting grooves 28 of the two bridge members 24 may be different from each other. In FIG. 1B, one bridge member 24 has three connecting grooves 28 while the other bridge member 24 has two connecting grooves 28. The number of the bridge members 24 provided to one rotary nut 22 may be one, three, or more.

Figure 2A:
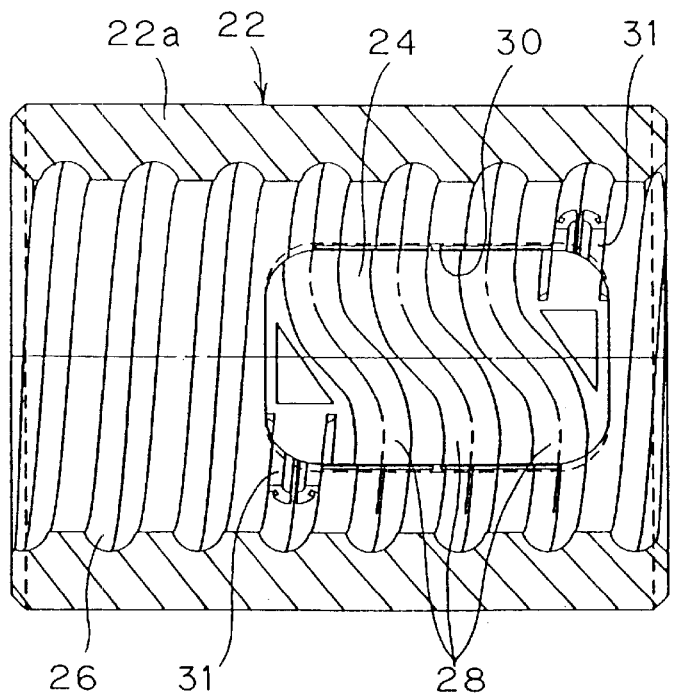
FIGS. 2A, 2B and 2C are a longitudinal sectional view, a fragmentary side view and a rear view, respectively, of a rotary nut of the ball screw.
Figure 2B:
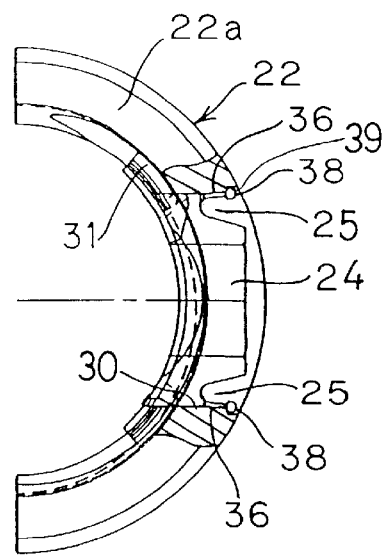
Figure 2C:
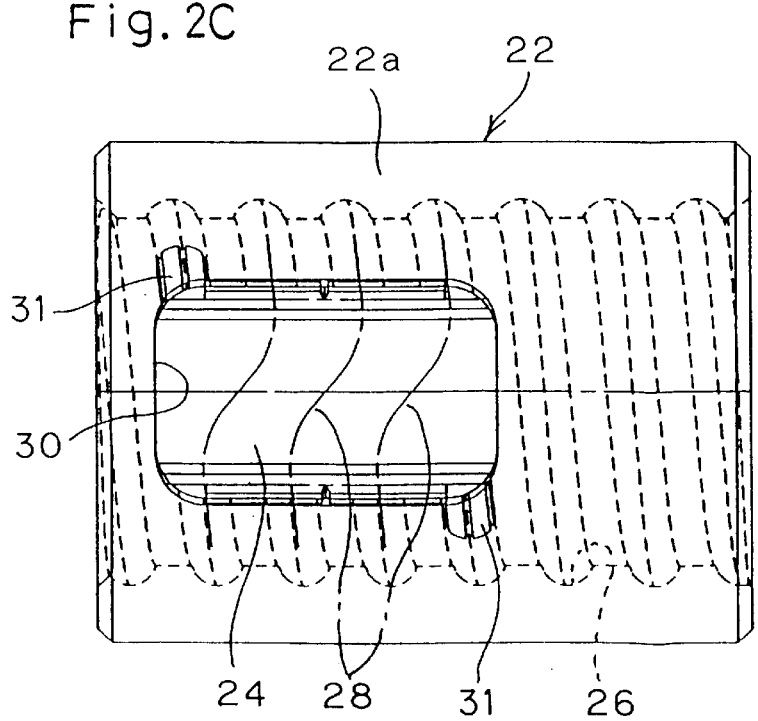
Figure 4A:
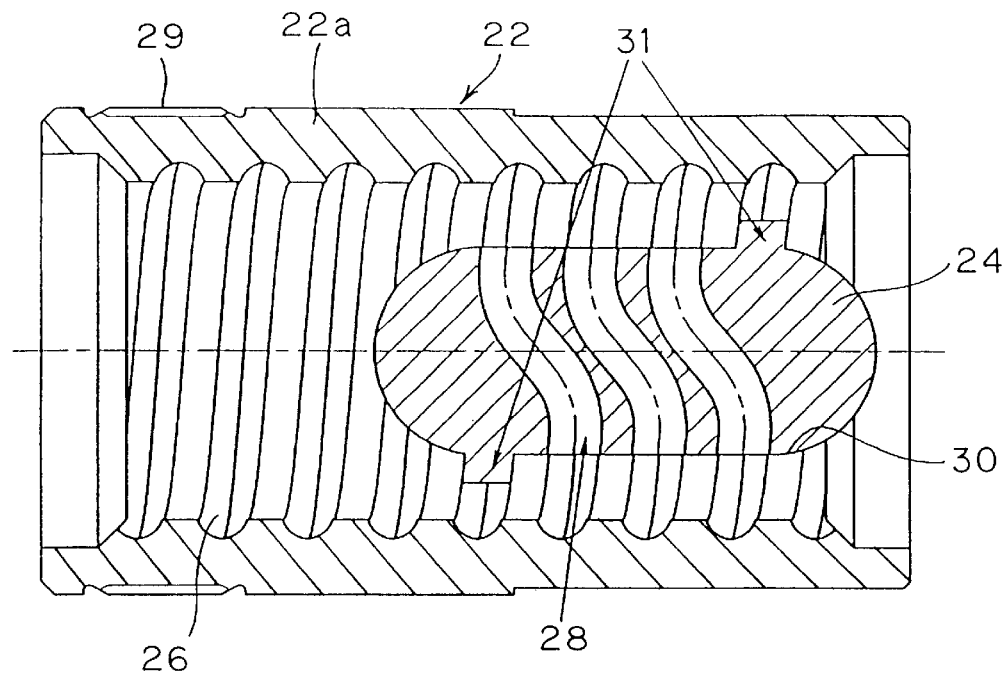
FIGS. 4A, 4B and 4C are a longitudinal sectional view, a side view with a portion broken away and an enlarged fragmentary sectional view, respectively, of the rotary nut in the ball screw.
Figure 4B:
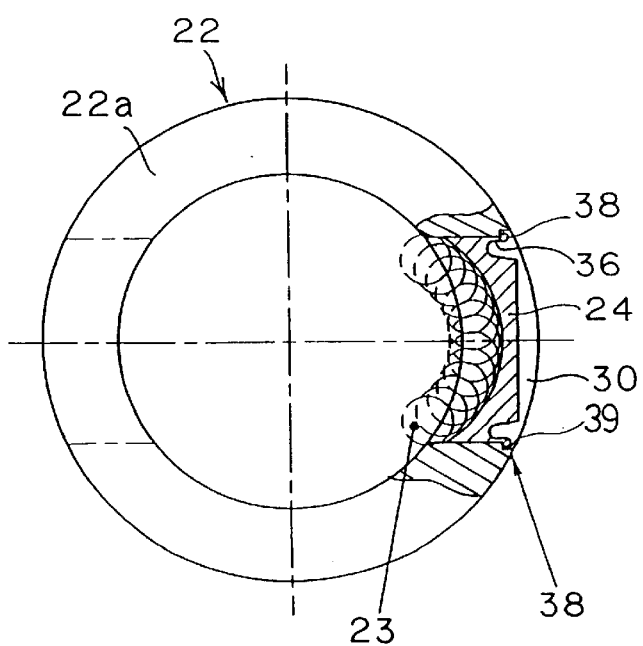
Figure 4C:
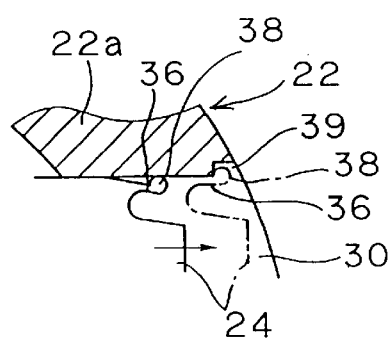

FIGS. 2A to 2C show an example of the rotary nut 22 and FIGS. 3A to 3E show an example of the bridge member 24. FIGS. 4A to 4C are simplified explanatory views of a structure of the rotary nut 22. In FIGS. 2A to 2C, an outer shape of the rotary nut 22 is simplified.

The nut body 22a of the rotary nut 22 has bridge member fitting openings 30 formed therein passing through inner and outer peripheral surfaces of the nut 22. The bridge member 24 is fitted in each of the bridge member fitting openings 30 from a radically inner side.

The bridge member 24 has a pair of arms 31, 31 that are engaged with the inner spiral groove 26 of the rotary nut 22 to secure a position of the bridge member 24 with respect to the nut body 22a of the rotary nut 22 in the axial direction. The arms 31, 31 are provided at axial opposite ends of the bridge member 24 to project in opposite directions to each other in the circumferential direction. Portions of the inner spiral groove 26 of the rotary nut 22 with which the arms 31 are engaged are non-ball circulating portions where the balls 23 do not circulate.

As shown in FIGS. 3A to 3E, each arm 31 is formed to have a semicircular sectional shape so as to fit in the inner spiral groove 26 and is provided with a slit 32 extending from a tip end toward a base portion. Also each arm 31 is formed with back side grooves 33 having semicircular sectional shapes on its back side surface opposite to a front side surface which is in contact with the inner spiral groove 26 and the slit 32 passes from the front surface of the arm 31 to the back side groove 33. The front surface of each arm 31 is provided with a plurality of longitudinal grooves 34 that have such depths as not to reach the back side groove 33.

Opposite side edges of the bridge member 24 in a circumferential direction of the rotary nut 22 have recessed portions 35 (FIG. 3(E)) formed on a radially outer surface of the bridge member 24 and recessed radially inwardly. A pair of guide walls 36 protruding radially outwardly from the recessed portions 35 are formed along the respective opposite side edges of the bridge member 24. Each of the guide walls 36 is divided in an axial direction into a plurality of wall pieces by a slits 37 extending from its tip end toward its base portion, and is provided with a detach preventing projection 38 along its tip end. The detach preventing projections 38 on the respective guide walls 36 protrude from the guide walls 36 in directions opposite to each other. The guide walls 36 are, as shown in FIG. 2B, in elastic contact with a pair of inner surfaces facing to each other of the bridge member fitting opening 30 of the nut body 22a and the projections 38 are engaged with engaging recessed portions 39 defined at radially outer opening edges of the bridge member fitting opening 30 of the nut body 22a.

The bridge member 24 is, as shown in FIG. 4B, fitted in the bridge member fitting opening 30 of the nut body 22a from radially inner side and is fixed to the nut body 22a when the pair of arms 31 sit on the inner spiral groove 26 and the detach preventing projections 38 of the guide walls 36 are engaged with the engaging recessed portions 39 at the opening edges of the bridge member fitting opening 30. It is possible to ensure fixing of the bridge member 24 by crimping the tip ends of the guide walls 36 or the detach preventing projections 38 after the detach preventing projections 38 are engaged with the engaging recessed portions 39.

Material of the bridge member 24 may be a sintered alloy. If the bridge member 24 is made of the sintered alloy, formation of the bridge member 24 is carried out by the use of an injection molding machine using a metallic powder adjusted to present a plastizeable form. In this injection molding, at the outset, a metallic powder and a binder prepared from a mixture of plastics with wax are kneaded in a kneading machine and the resultant kneaded product is subsequently palletized to produce pellets. The pellets so prepared are supplied into a hopper of the injection molding machine and are, after having been heated to melt within the injection molding machine, injected into a mold. The above metallic powder is preferably in the form of a material capable of being subsequently carbonized and quenched and may comprise, for example, 0.3% of carbon (C), 1 to 2% nickel (Ni) and the balance being iron (Fe).

The nut body 22a of the rotary nut 22 may be made of the sintered alloy similar to the bridge member 24.

Figure 5:
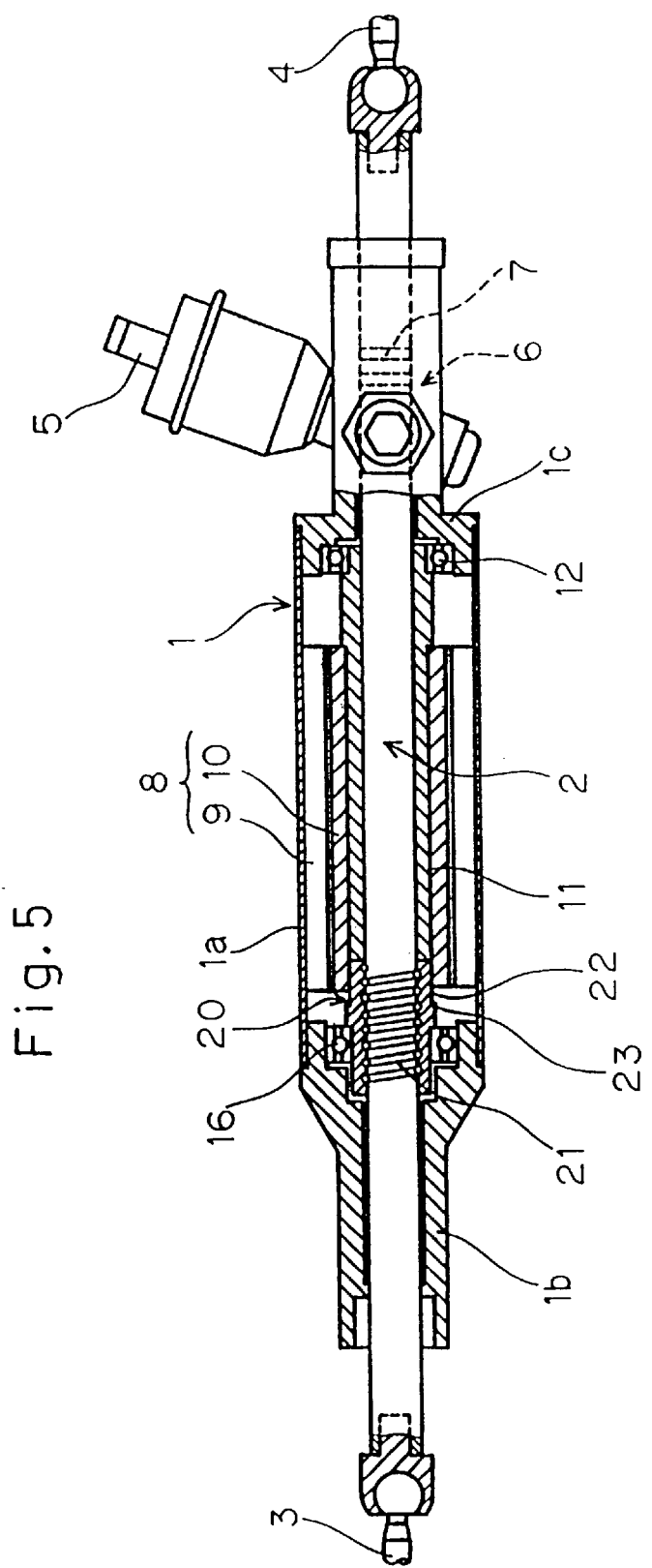
FIG. 5 is a front view with a portion broken away of an electrically powered steering device according to the one embodiment of the invention.
Figure 6A:
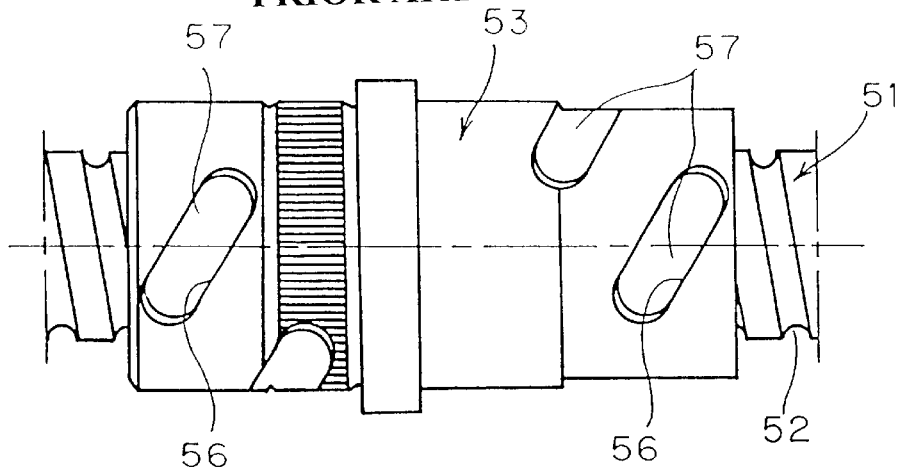
FIGS. 6A, 6B and 6C are a front view of a prior-art ball screw, a sectional view thereof and a perspective view of a bridge member of the ball screw, respectively.
Figure 6B:
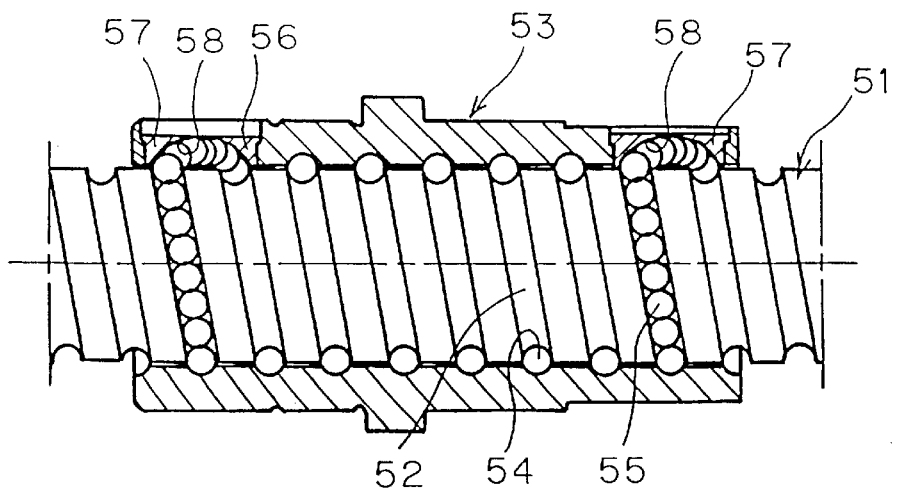
Figure 6C:
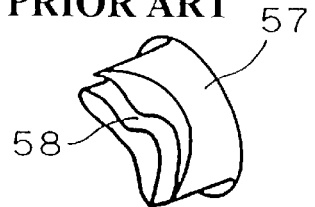

Next, an example of an electrically powered steering device having the ball screw 20 will be described. FIG. 5 is a side view of the electrically powered steering device with a portion broken away. In FIG. 5, a housing 1 has a bracket (not shown) through which the housing 1 is fixedly connected to an automobile chassis or body structure. This housing 1 includes a steering shaft 2 passing through the housing 1 and the steering shaft 2 is connected at its opposite ends with respective tie rods 3 and 4 which are in turn connected with a steering mechanism (not shown) for steering vehicle wheels.

A steering rod 5 extends diagonally upwardly from a vicinity of one end portion of the housing 1 and has an upper end fixedly connected with a steering wheel. The steering rod 5 is rotatably supported and rotation of the steering rod 5 is transmitted to the steering shaft 2 through a motion translating mechanism 6 from a lower end of the steering rod 5 so that the steering shaft 2 can be moved axially. The motion translating mechanism 6 includes a rack 7 which may be a part of a longitudinal portion of the steering shaft 2 and a pinion (not shown) mounted on the lower end of the steering rod 5 and meshed with the rack 7 within the housing 1. Although not shown, a steering torque detector is mounted in association with the steering rod 5 for detecting a steering torque with which the steering wheel isturned.

The housing 1 is formed in a cylindrical shape and is of a construction including an intermediate cylindrical body 1a and end members 1b and 1c coupled with opposite ends of the intermediate cylindrical body 1a. A stator 9 of an electric drive motor 8 is positioned within the housing 1 and intermediate of the length of the housing 1. The stator 9 is comprised of a core and a stator coil. A rotor 10 of the electric drive motor 8 is housed within the stator 9 and has an outer peripheral surface spaced radially inwardly from an inner peripheral surface of the stator 9 to define a gap therebetween. The rotor 10 is made of a magnetic material into a cylindrical shape and is mounted to an outer periphery of a sleeve 11 for rotation together therewith. The steering shaft 2 extends within the sleeve 11 for movement in a direction axially thereof. The electric drive motor 8 is controlled by a motor control circuit (not shown) according to the torque detected by the steering torque detector.

One of opposite ends of the sleeve 11 adjacent, for example, the steering rod 5 as shown is rotatably supported within the housing 1 by means of a bearing 12. The bearing 12 may be a single bearing or a combination of a plurality of bearings and is of a type capable of supporting not only a radial load, but also a thrust load.

Rotation of the electric drive motor 8 can be transmitted to the steering shaft 2 through a ball screw 20 to move the steering shaft 2 axially. The ball screw 20 includes a screw shaft 21 which is represented by an axial portion of the steering shaft 2. The ball screw 20 also includes a rotary nut 22 supported rotatably within the housing 1 through a bearing 16 that is mounted externally on the rotary nut 22 and having one end fitted into the rotor 10 of the electric drive motor 8. One end of the rotor 10 adjacent the rotary nut 22 protrudes from the sleeve 11 toward the rotary nut 22 so as to receive the rotary nut 22 under interference fit. The rotary nut 22 has the coarse surface portion 29 (FIG. 1(A)) on its outer periferal surface as described above and an inner periferal surface of the rotor 10 is fitted with the coarse surface portion 29.

The bearing 16 may be a single bearing or a combination of a plurality of bearings and is of a type capable of supporting not only a radial load, but also a thrust load. As the bearing 16, the rolling bearing is employed in the form of, for example, an angular ball bearing or the like and is of a design including inner and outer races with a group of rolling elements interposed between the inner and outer races.

The operation and function of the structure described above will now be described. Assuming that the automotive vehicle is driven straight without the steering wheel being substantially turned, the steering torque detector (not shown) associated with the steering rod 5 provides no output and, therefore, the electric drive motor 8 is held in inoperative position by the motor control means (not shown). Accordingly, the electrically powered steering device is in position not to provide an assisted steering force.

In the event that the steering wheel is turned, the steering torque detector associated with the steering rod 5 provides an output therefrom and, under the control of the motor control circuit, the electric drive motor 8 rotates the rotor 10. As the rotor 10 is rotated, the rotary nut 22 of the ball screw 20 undergoes rotation together with the rotor 10, causing the steering shaft 2, which is an integral part of the screw shaft 21, to move axially to thereby produce an assisted steering force.

At this time, as the rotary nut 22 rotates, the balls 23 of the ball screw 20 rollingly move within the ball rolling guideway 27 defined between the spiral inner and outer grooves 25 and 26.

In this way, the steering force of the steering wheel can be assisted by the electric drive motor 8.

In the electrically powered steering device, since a plurality of connecting grooves 28 of the rotary nut 22 are provided to one bridge member 24, the pitch of the inner spiral grooves 26 can be reduced while disposing the required number of the bridge members 24 with no difficulty in terms of the space available therefor. As a result, it is possible to increase the number of balls to be circulated and the capacity load without increasing the length of the rotary nut 22. Since the diameter of the nut can be reduced similarly to the prior art bridge type ball screw, it is now possible to form the ball screw that is compact and has high load capacity. Moreover, because the plurality of connecting grooves 28 are provided to one bridge member 24, the number of the bridge members 24 can be small and hence, the number of the parts can be reduced thereby facilitating machining process, and the fabrication cost can be reduced. Furthermore, because the plurality of connecting grooves 28 are provided to one bridge member 24, accuracy in forming the connecting grooves 28 can be improved easily.

The bridge member 24 can be positioned with high accuracy because the arms 31 are provided to be engaged with the inner spiral groove 26 formed as a ball raceway of the rotary nut 22. Because the arm 31 is provided with the slit 32, the arm 31 can have elasticity and can be fitted smoothly with an inner surface of the inner spiral groove 26 without a gap therebetween.

Because the bridge member 24 is formed on opposite sides thereof with the guide walls 36 such that the guide walls 36 are in elastic contact with the inner periferal surfaces of the bridge member fitting opening 30 of the nut body 22a, the bridge member 24 is fixed to the bridge member fitting opening 30 without a gap therebetween and accurate fixing can be achieved easily. When the bridge member 24 is inserted into the bridge member fitting opening 30 of the nut body 22a from the radially inner side, the arms 31 are brought to sit on the inner spiral grooves 26, and the detach preventing projections 38 at the tip ends of the guide walls 36 are brought into engagement with the radially outer opening edges of the bridge member fitting opening 30. Therefore, the bridge member 24 can be fixed easily only by insertion work with no need of providing separate detach preventing means or carrying out detach preventing work separately.

If the bridge member 24 is made of the sintered alloy, the bridge member can be produced by formation such as injection molding and sintering, which does not require machining such as turning or grinding and which has satisfactory mass productivity. Therefore, manufacturing at low cost can be attained.

Because the ball screw 20 that is a main component part of the electrically powered steering device for transmitting the motor output has the above-described structure and because the ball screw 20 can be made compact while having high load capacity, the whole electrically powered steering device can be made compact.

Although the present invention has been fully described in connection with the preferred embodiments thereof with reference to the accompanying drawings which are used only for the purpose of illustration, those skilled in the art will readily conceive numerous changes and modifications within the framework of obviousness upon the reading of the specification herein presented of the present invention. Accordingly, such changes and modifications are, unless they depart from the scope of the present invention as delivered from the claims annexed hereto, to be construed as included therein.

What is claimed is:

1. A ball screw which comprises:
   a screw shaft;
   a rotary nut having at an inner periphery thereof an inner spiral groove facing the screw shaft;
   a plurality of balls disposed in a rolling guideway formed between the screw shaft and the inner spiral groove for transmitting a force between the rotary nut and the screw shaft; and a bridge member fitted to the rotary nut and having a plurality of connecting grooves, each connecting neighboring convolutions of the inner spiral groove, wherein said bridge member is provided with an arm being engaged with the inner spiral groove of the rotary nut so as to position the bridge member in an axial direction with respect to the rotary nut; and wherein said arm is provided with a slit extending from a tip end toward a base portion of the arm.

2. The ball screw as claimed in claim 1, wherein said bridge member is provided with a pair of guide walls protruding radially outwardly from the rotary nut from opposite edges of the bridge member confronting to each other in a circumferential direction of the rotary nut and the guide walls are in elastic contact with a pair of inner surfaces, facing each other, of a bridge member fitting opening formed in the rotary nut.

3. The ball screw as claimed in claim 2, wherein said bridge member is inserted into said bridge member fitting opening formed in the rotary nut from a radially inner side, said pair of guide walls being provided at tip ends thereof with detach preventing projections, and the detach preventing projections being engaged with opening edges at a radially outer side of said bridge member fitting opening.

4. The ball screw as claimed in claim 2, wherein each of said guide walls is provided with a slit extending from a tip end toward a base portion side of the guide wall.

5. The ball screw as claimed in claim 1, wherein said bridge member is made of a sintered alloy.

6. An electrically powered steering device which comprises:

a housing;

a steering shaft connected to a steering mechanism for steering wheels;

a motion translating mechanism for translating a rotary force exerted by a steering wheel into a force required to move said steering shaft in a longitudinal direction;

a ball screw including a screw shaft constituted by a portion of said steering shaft; and an electric drive motor fitted with the rotary nut of the ball screw, wherein said ball screw is constituted by the ball screw as claimed in claim 1.

7. A ball screw which comprises:

a screw shaft;

a rotary nut having at an inner periphery thereof an inner spiral groove facing the screw shaft;

a plurality of balls disposed in a rolling guideway formed between the screw shaft and the inner spiral groove for transmitting a force between the rotary nut and the screw shaft; and a bridge member fitted to the rotary nut and having a plurality of connecting grooves, each connecting neighboring convolutions of the inner spiral groove, wherein said bridge member is provided with a pair of guide walls protruding radially outwardly from the rotary nut from opposite edges of the bridge member confronting to each other in a circumferential direction of the rotary nut and the guide walls are in elastic contact with a pair of inner surfaces, facing each other, of a bridge member fitting opening formed in the rotary nut.

8. The ball screw as claim in claim 7, wherein said bridge member is inserted into said bridge member fitting opening formed in the rotary nut from a radially inner side, said pair of guide walls being provided at tip ends thereof with detach preventing projections, and the detach preventing projections being engaged with opening edges at a radially outer side of said bridge member fitting opening.

9. The ball screw as claimed in claim 7, wherein each of said guide walls is provided with a slit extending from a tip end toward a base portion side of the guide wall.

* * * * *